United States Patent
Yan

(10) Patent No.: US 8,248,969 B2
(45) Date of Patent: Aug. 21, 2012

(54) STACKING SYSTEM AND A METHOD FOR SWITCHING TRAFFIC IN THE STACKING SYSTEM

(75) Inventor: Dehan Yan, Beijing (CN)

(73) Assignee: Hangzhou H3C Technologies Co., Ltd, Hangzhou (CN)

(*) Notice: Subject to any disclaimer, the term of this patent is extended or adjusted under 35 U.S.C. 154(b) by 252 days.

(21) Appl. No.: 12/757,266

(22) Filed: Apr. 9, 2010

(65) Prior Publication Data

US 2011/0007670 A1  Jan. 13, 2011

(30) Foreign Application Priority Data

Jul. 7, 2009 (CN) .......................... 2009 1 0088673

(51) Int. Cl.
*H04L 12/28* (2006.01)
(52) U.S. Cl. .......................... 370/258; 370/255; 370/257
(58) Field of Classification Search .................. 370/254, 370/255, 256, 257, 258
See application file for complete search history.

(56) References Cited

U.S. PATENT DOCUMENTS

| | | | | |
|---|---|---|---|---|
| 6,785,272 | B1* | 8/2004 | Sugihara ........................ | 370/386 |
| 7,164,684 | B2* | 1/2007 | Matteson et al. ............. | 370/401 |
| 7,764,682 | B2* | 7/2010 | Sievert .......................... | 370/389 |
| 7,782,800 | B2* | 8/2010 | Swain ........................... | 370/257 |
| 2001/0021177 | A1* | 9/2001 | Ishii .............................. | 370/256 |
| 2002/0172224 | A1* | 11/2002 | Matteson et al. ............. | 370/502 |
| 2006/0092853 | A1* | 5/2006 | Santoso et al. ................ | 370/252 |
| 2006/0146697 | A1* | 7/2006 | Magret et al. ................. | 370/219 |
| 2008/0137530 | A1* | 6/2008 | Fallis et al. .................... | 370/216 |
| 2008/0155046 | A1* | 6/2008 | Swain ........................... | 709/208 |
| 2008/0155073 | A1* | 6/2008 | Swain ........................... | 709/222 |
| 2008/0155126 | A1* | 6/2008 | Swain ........................... | 709/251 |
| 2008/0205418 | A1* | 8/2008 | Rose et al. .................... | 370/401 |
| 2008/0301319 | A1* | 12/2008 | Dernosek et al. ............. | 709/232 |
| 2009/0086620 | A1* | 4/2009 | Fowler et al. ................. | 370/216 |
| 2009/0135715 | A1* | 5/2009 | Bennah et al. ................ | 370/217 |
| 2010/0017873 | A1* | 1/2010 | Sievert .......................... | 726/17 |
| 2010/0142410 | A1* | 6/2010 | Huynh Van et al. .......... | 370/255 |

* cited by examiner

*Primary Examiner* — Chuong T Ho

(57) ABSTRACT

The invention provides a stacking system and a method for traffic switching in the stacking system, comprising: when newly joined devices in the stacking system make the daisy chain topology change to ring topology, block a stack port of one of the newly joined devices; after the devices in the stacking system perform another topology convergence process, the master restores the configuration of the newly joined devices; after the configuration of the newly joined device one of whose stack ports is blocked is restored, it sets its blocked stack port to the forwarding state, calculates the shortest path based on the ring topology, and sends first notification packets for topology change from daisy chain type to ring type through its two stack ports; each device that receives the first notification packets re-calculates its shortest forwarding path respectively and switches the traffic, and then forwards the first notification packets. This invention can prevent traffic interruption that occurs when the topology of a stacking system changes from daisy chain to ring.

20 Claims, 5 Drawing Sheets

STACKING SYSTEM AND A METHOD FOR SWITCHING TRAFFIC IN THE STACKING SYSTEM

BACKGROUND

A stacking system is a logical device formed by connecting two or more devices, providing high availability, high scalability and streamlined management for users. Devices in a stacking system are connected by stack cables in a daisy chain connection mode or ring connection mode.

The present invention comprises: when the daisy chain topology is stable, a device joins the stacking system and the topology changes to ring topology. As shown in FIG. 1, the topology of the original stacking system is a daisy chain topology formed by devices S2, S1, S8, S7, S6, S5 and S4. When the topology becomes stable, device S3 joins the stacking system, and the topology changes to ring topology. In this case, the shortest forwarding path should be re-calculated, and traffic should be switched if necessary. The current technology implements this in the is following ways:

When the daisy chain topology of the stacking system is stable, each device in the stacking system calculates the shortest forwarding path and packet discarding rules. When device S3 joins the stacking system, if a stack port of S3 is blocked, meaning it stops sending and receiving packets. As illustrated in FIG. 2, the topology is considered as a daisy chain topology, and traffic between S2 and S4 is forwarded over path S2-S1-S8-S7-S6-S5-S4. Master S1 restores the configuration of device S3 through path S1-S2-S3. After configuration restoration is completed, the blocked stack port of S3 restores to the forwarding state, and master S1 updates the stored topology information, re-calculates the shortest forwarding path and switches the traffic, and then notifies other devices of the topology change through sending notification packets. Upon receiving the notification packets, each device re-calculates the shortest forwarding path and switches the traffic. In this way, traffic between S1 and S4 is switched from path S1-S8-S7-S6-S5-S4 to path S1-S2-S3-S4.

Although the method in the current technology can implement traffic switching from the daisy chain topology to ring topology, traffic interruption will occur between some devices because master S1 sends notification packets for topology change to trigger other devices to calculate the shortest forwarding path after calculating its own shortest forwarding path. For example, after master S1 calculates its shortest forwarding path, the forwarding path for switching traffic from S1 to S4 changes to S1-S2-S3-S4; however, when calculation of the shortest forwarding path of S2 is not completed, traffic is forwarded over path S2-S1-S8-S7-S6-S5-S4, and this results in traffic interruption between S1 and S4.

SUMMARY

This invention provides a stacking system and a method for traffic switching in the stacking system, thus to avoid traffic interruption when the topology of the stacking system changes from daisy chain to ring.

A traffic switching method in a stacking system, comprising: when devices that newly join the stacking system make the topology change from daisy chain to ring, blocking a stack port of one of the newly joined devices, further comprising:

A. After each device in the stacking system performs another topology convergence process, the master restores the configuration of the newly joined device.

B. After the configuration of the newly joined device one of whose stack ports is blocked is restored, it sets the blocked stack port to the forwarding state, calculates the shortest forwarding path based on the ring topology, and sends first notification packets for topology change from daisy chain type to ring type through its two stack ports.

C. Each device that receives the first notification packets re-calculates the shortest forwarding path and switches the traffic, and then forwards the first notification packets.

A stacking system, comprising: when the newly joined devices in the stacking system make the topology change from daisy chain type to ring type, a stack port of one of the newly joined devices is blocked;

The master in the stacking system, used for restoring the configurations of the newly joined devices after the devices in the stacking system perform another daisy chain topology convergence process based on the newly joined devices;

The newly joined device one of whose stack ports is blocked in the stacking system, used for setting the blocked stack port to the forwarding state, calculating the shortest forwarding path based on the ring topology, and sending first notification packets for topology change from daisy chain type to ring type through its two stack ports after its configuration is restored;

Upon receiving the first notification packets, each device re-calculates the shortest forwarding path and switches the traffic, and then forwards the first notification packet.

The preceding technology scheme shows that the method and system provided by this invention blocks a stack port of one of the newly joined devices in the stacking system to keep the daisy chain topology when these devices make the topology change to ring topology, thus to ensure that forwarding path of other devices will not be affected before the configuration of the newly joined devices are restored. After the configurations of the newly joined devices are restored, the blocked stack port is set to the forwarding state, and the newly joined device one of whose stack port is blocked starts to calculate the shortest forwarding path based on the ring topology, and then sends notification packets for topology change to ensure that other devices perform shortest forwarding path calculation and traffic switch in turn, thus to ensure that the shortest forwarding path of each device is the same at a time and avoid traffic interruption.

DESCRIPTION

To clarify the aims, technical proposals, and advantages of the present invention, the following part describes the present invention detailedly in conjunction with the figures and embodiments.

Figure 3:
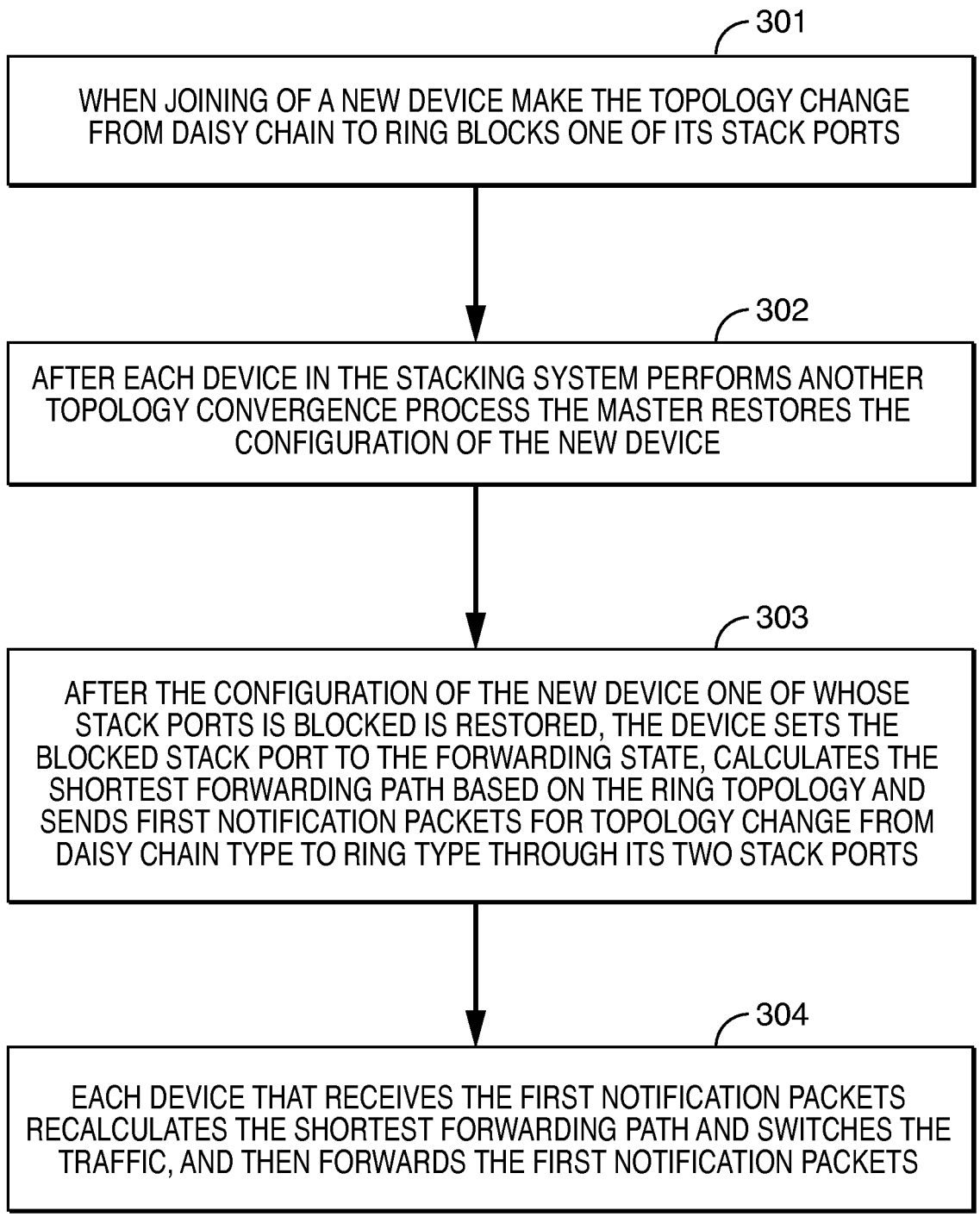
FIG. 3 illustrates a flow chart of a method provided by the present invention.

The method provided by this invention is as illustrated in FIG. 3, comprising these steps:

At step 301: When newly joined devices make the topology change from daisy chain to ring, blocks a stack port of one of the newly joined devices.

At step 302: After each device in the stacking system performs another topology convergence process, the master restores the configuration of the newly devices.

At step 303: After the configuration of the newly joined device one of whose stack ports is blocked is restored, the device sets the blocked stack port to the forwarding state, calculates the shortest forwarding path based on the ring topology, and sends first notification packets for topology change from daisy chain type to ring type through its two stack ports.

At step 304: Each device that receives the first notification packets re-calculates its shortest forwarding path and switches the traffic, and then forwards the first notification packets.

Figure 4:
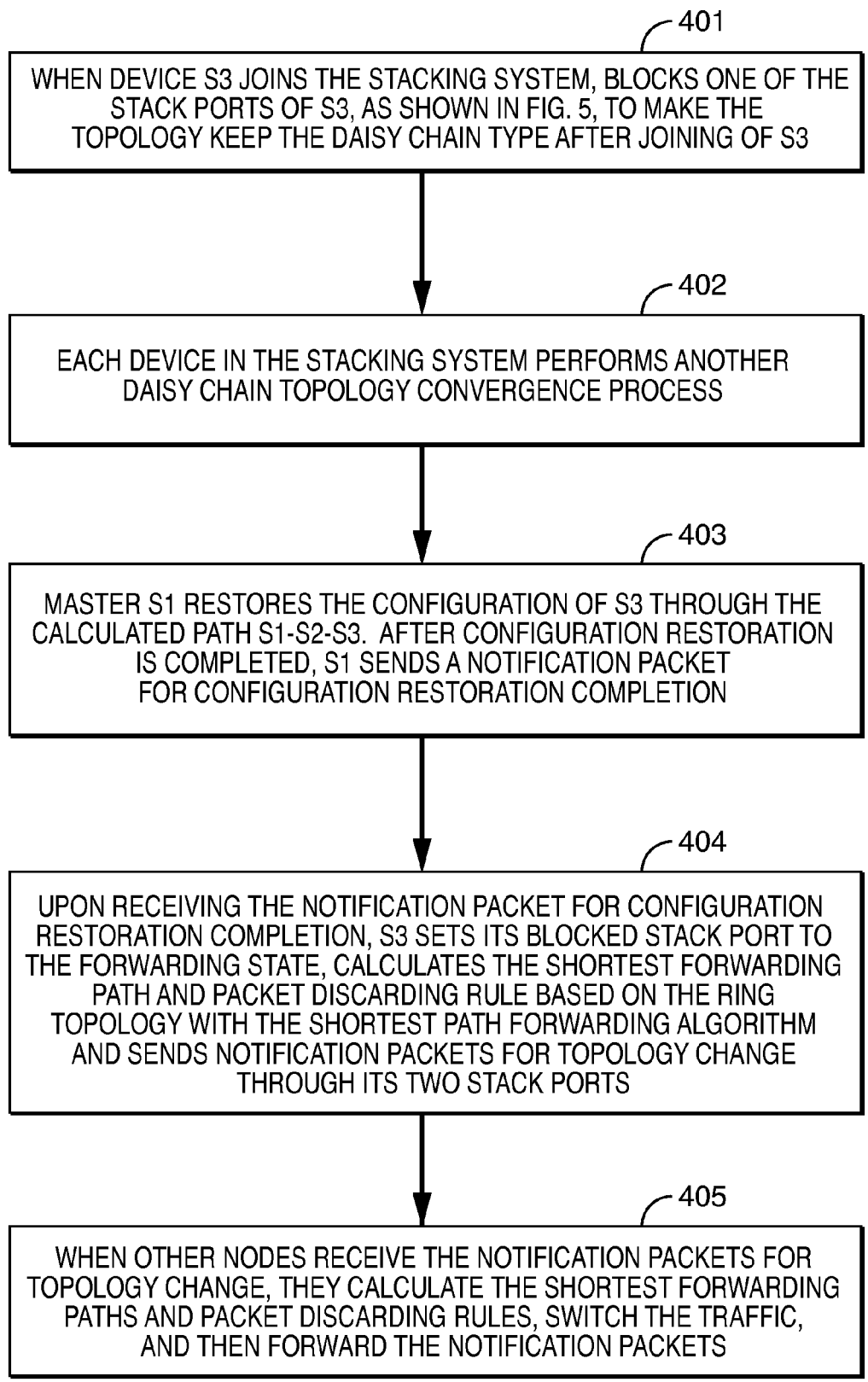
FIG. 4 illustrates a flow chart of a method provided by the present invention when a new device joins the stacking system.

Reference will now be made, by way of example, to the accompanying drawing which aids in understanding an embodiment of the present invention and in which: in the stacking system, a stable daisy chain topology has been formed, each node has calculated its own shortest forwarding tree, and the path from each node to all the other nodes is reachable, for example, the forwarding path from S2 to S1, S8, S7, S6, S5, and S4 is anticlockwise, and that from S4 to S5, S6, S7, S8 and S1 is clockwise. At this time, joining of S3 makes the topology of the stacking system change to ring type. As illustrated in FIG. 4, the method comprises the following steps:

At step 401: After S3 joins the stacking system, one of its stack ports is blocked, as shown in FIG. 5, to make the topology keep the daisy chain type.

Figure 5:
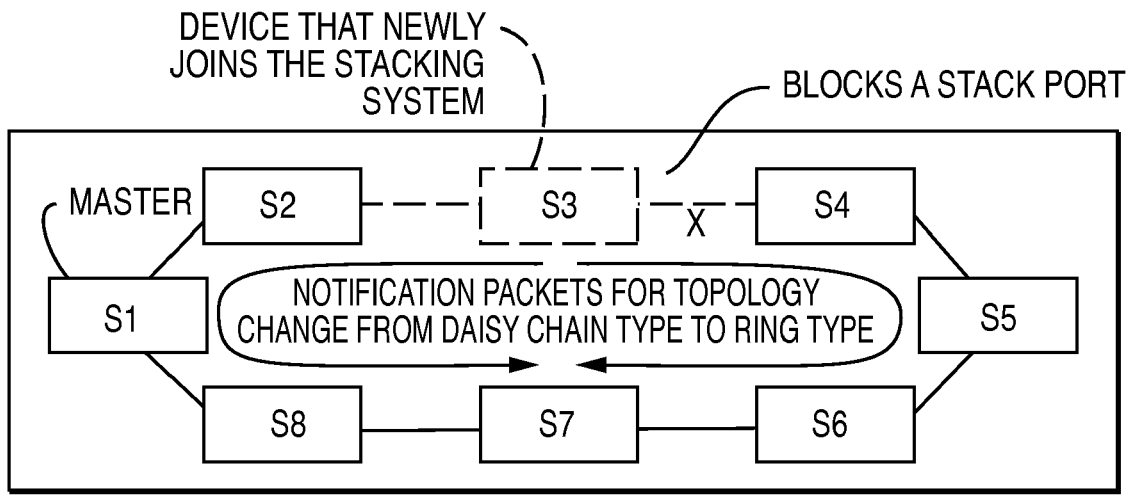
FIG. 5 is the schematic diagram illustrating an architecture of the method shown in FIG. 4 according to an embodiment of the present invention.

To avoid topology collection and shortest forwarding path calculation caused by topology change and traffic interruption caused by shortest forwarding path calculation and traffic switching in an abnormal order after S3 joins the stacking system, a stack port (the right stack port as shown in FIG. 5) of S3 is blocked at this step to make the topology keep the daisy chain type.

At step 402: Each device in the stacking system performs another daisy chain topology convergence process.

Joining of S3 makes each device in the stacking system aware of that, thus to trigger topology collection and shortest forwarding path calculation. Because a stack port of S3 is blocked, the topology is still of daisy chain type. After topology convergence, joining of S3 will not affect the forwarding path of other nodes, and they still forward packets over the shortest forwarding path of the original topology. However, because any path between S2 and S4 is reachable, it ensures that the path from S3 to any other node is reachable and traffic will not be interrupted.

At step 403: Master S1 restores the configuration of S3 over the calculated path S1-S2-S3, and sends notification packets for configuration restoration completion after configuration restoration is completed.

At this step, configuration restoration of S3 performed by S1 includes: member ID distribution and stack port configuration.

At step 404: Upon receiving the notification packets for configuration restoration completion, S3 sets its blocked stack port to the forwarding state, calculates the shortest forwarding path and packet discarding rules based on the ring topology with the shortest path forwarding algorithm, and sends notification packets for topology change from daisy chain type to ring type through its two stack ports.

Upon receiving the notification packets for configuration restoration completion, S3, one of whose stack ports is blocked confirms is configuration restoration completion, and sets the blocked stack port to the forwarding state, and then the topology changes from daisy chain type to ring type. At this time, S3 will perform ring topology collection, calculate the shortest forwarding path and packet discarding rules based on the ring topology.

The packet discarding rules of this invention comprise: 1) Discarding a packet sent by the local device, thus ensuring that no loop occurs in any case. 2) Discarding a packet not from the shortest forwarding path, thus ensuring that no more than one packet is received. Packets involved include broadcasts, multicasts and unknown unicasts.

After step 403 is performed, only S3 has finished ring topology-based shortest forwarding path calculation. This does not affect the forwarding paths of other nodes, and they can forward packets based on the shortest forwarding paths of the original daisy chain topology. However, because any path between S2 and S4 is reachable, it ensures that the paths from S3 to any other nodes are reachable and the traffic will not be interrupted.

At step 405: When other nodes receive the notification packet for topology change from daisy chain type to ring type, they calculate the shortest forwarding paths and packet discarding rules, switch the traffic, and then forward the notification packet.

For example, in the anticlockwise direction, when S2 receives the notification packets sent by S3 for topology change from daisy chain type to ring type, it re-calculates the shortest forwarding path and packet discarding rules based on the collected ring topology information, switches the traffic, and then sends the notification packets to next hop S1; in the clockwise direction, when S2 receives the notification packets sent by S3 for topology change from daisy chain type to ring type, it re-calculates the shortest forwarding path and packet discarding rules based on the collected ring topology information, switches the traffic, and then sends the notification packet to next hop S1, and so on. This ensures that the shortest path switching is started from S3 in turn, the traffic switch of S2 does not affect the forwarding path of other devices, and any path between S2 and S4 is reachable. Therefore, no traffic interruption will occur.

The speed for the devices in the clockwise direction and anticlockwise direction to process the notification packet for topology change from daisy chain type to ring type may be different. For example, if S2 is too busy, and cannot process the notification packet sent by S3 for a long time in the clockwise direction, while S1 has processed the notification packet for topology change from daisy chain type to ring type, namely, S1 has switched the shortest forwarding path, while S2 has not, S1 may consider that the path to S4 is S1-S2-S3-S4, while the shortest forwarding path of S2 is still S2-S1-S8-S7-S6-S5-S4, which will result in traffic interruption between S1 and S2. To avoid this problem, the forwarding hop information can be carried in the notification packet for topology change sent by S3 from daisy chain type to ring type. If the number of the devices M in the stacking system is an even number, the forwarding hops carried in the first notification packet at step B is $$\frac{M}{2};$$

if the number of the devices M in the stacking system is an odd number, the forwarding hops carried in the first notification packet sent through the stack port whose status changed from blocked to forwarding at step B is $$\frac{M+1}{2},$$

and the forwarding hops carried in the first notification packet sent through the other stack port is $$\frac{M+1}{2}$$

or $$\frac{M-1}{2}.$$

Figure 1:
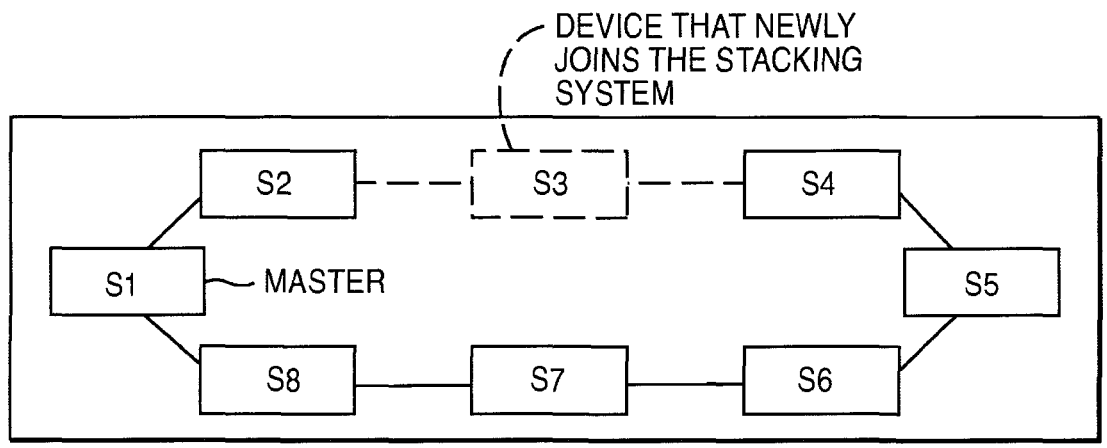
FIG. 1 is a schematic diagram illustrating topology change of the stacking system from daisy chain to ring.
Figure 2:
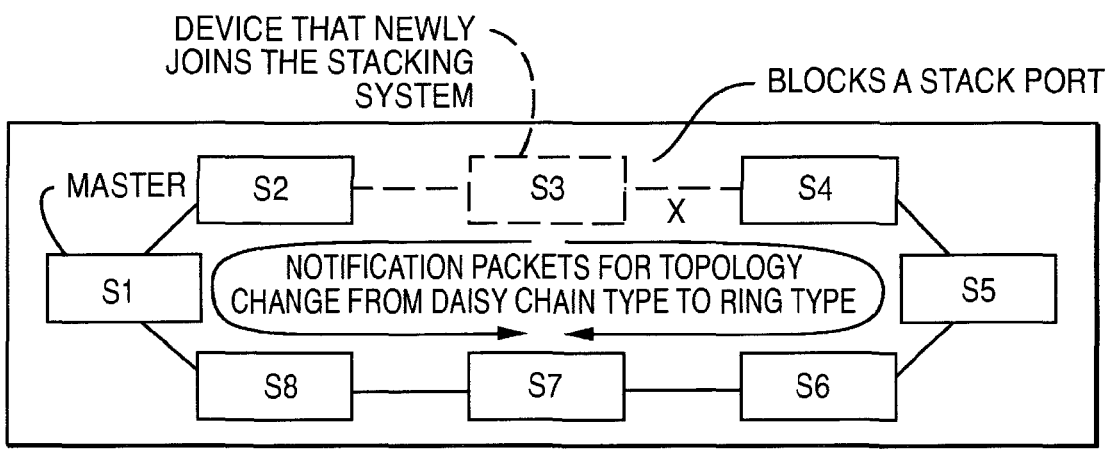
FIG. 2 is a schematic diagram illustrating how the current technology processes the architecture shown in FIG. 1.

Upon receiving the notification packet for topology change from daisy chain type to ring type, each device decreases the forwarding hops carried in the notification packet by 1, and determines whether the forwarding hop is 0 after that; if yes, they do not process the packet; otherwise, they process the packet following step 404. Take FIG. 1 as an example. The forwarding hop carried in the notification packet sent by S3 is 4. Each device in the stacking system forwards the packet following paths S3-S2-S1-S8 and S3-S4-S5-S6 in the two directions. It means that the notification packet stops at S7, and S7 does not process the notification packet. Because the hops from S7 to S3 in both directions are the same, no shortest forwarding path calculation and traffic switch are needed.

After steps 401 through 405, load balancing is implemented in the stacking system, and the ring topology of the stacking system is stable. The path from S1 to S4 changes to S1-S2-S3-S4, not S1-S8-S7-S6-S5-S4.

Figure 6:
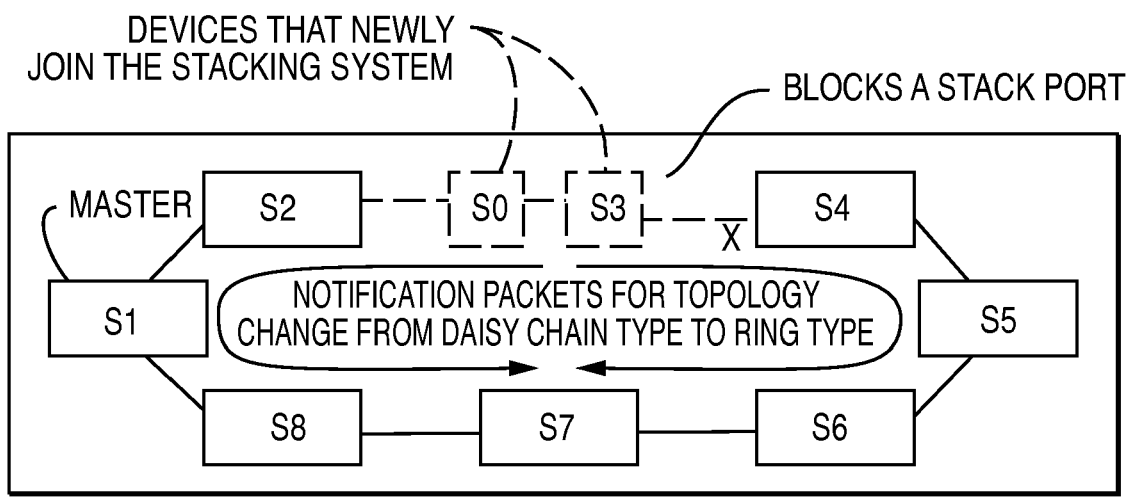
FIG. 6 illustrates a flow chart of a method provided by the present invention when more than one new device joins the stacking system.
Figure 7:
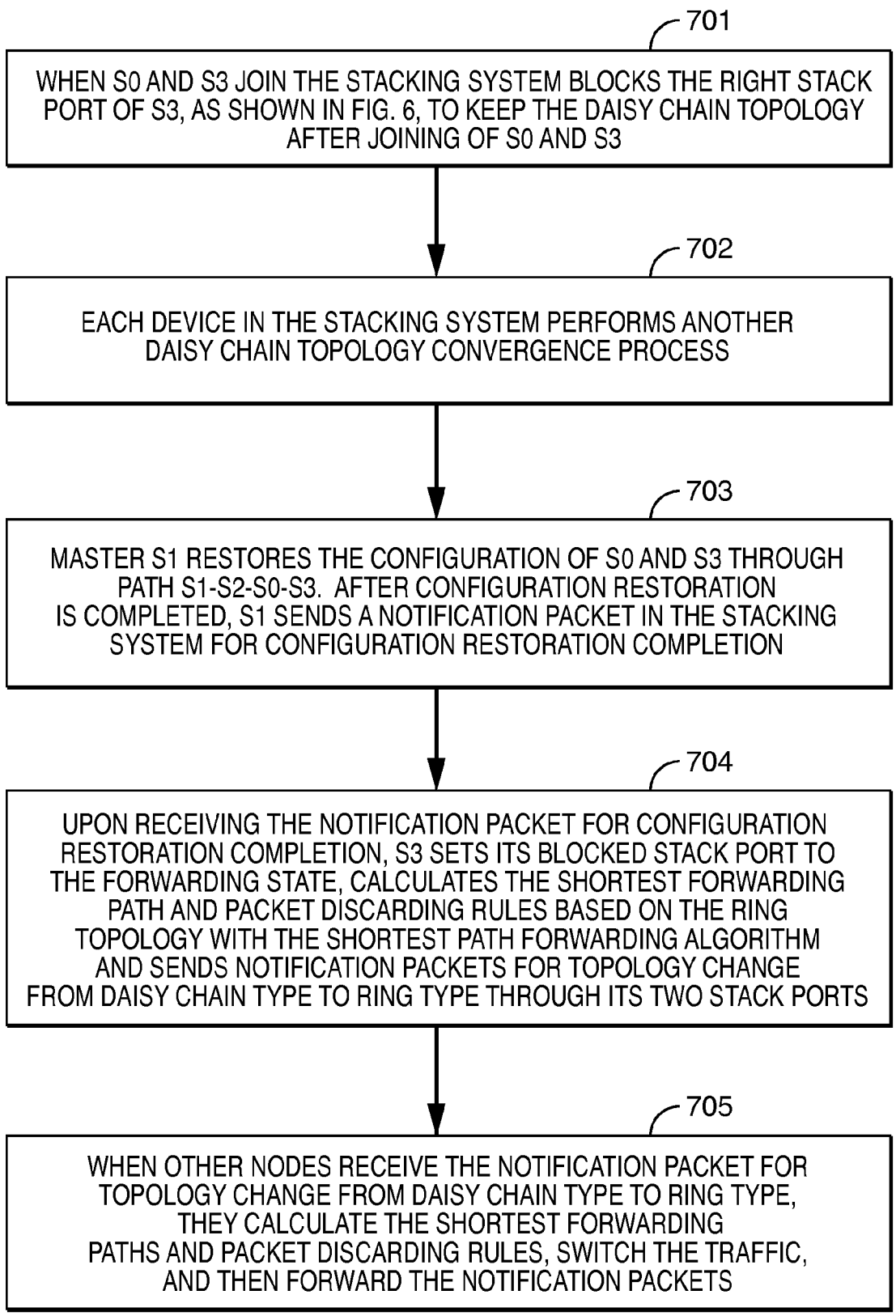
FIG. 7 illustrates a flow chart of a method provided by the present invention when more than one new device joins the stacking system.

When joining of more than one device makes the daisy chain topology change to ring topology, for example, as shown in FIG. 6, joining of S3 and S0 makes the daisy chain topology change to ring topology, the method provided by this invention also applies, which comprises the following steps:

At step 701: When S0 and S3 join the stacking system, blocks the right stack port of S3, as shown in FIG. 6 to keep the daisy chain topology after joining of S0 and S3.

When more than one device joins the stacking system to make the topology change from daisy chain type to ring type, blocks a stack port of one of the newly joined devices in the stacking system to stop it from sending and receiving packets. The right stack port of S3 is blocked in this embodiment, and the stack ports on S2 can also be blocked.

At step 702: Each device in the stacking system performs another daisy chain topology convergence process.

Joining of S0 and S3 makes each device in the stacking system aware of that, thus triggering topology collection and shortest forwarding path calculation. Because a stack port of S3 is blocked, the topology is still of daisy chain type. After topology convergence, joining of S0 and S3 will not affect the forwarding paths of other nodes, and they still forward packets over the shortest forwarding path of the original daisy chain topology. However, because any path between S2 and S4 is reachable, it ensures that the path from S0 and S3 to any other node is reachable and traffic will not be interrupted.

At step 703: Master S1 restores the configurations of S0 and S3 through path S1-S2-S0-S3. After configuration restoration is completed, S1 sends a notification packet in the stacking system for configuration restoration completion.

At step 704: Upon receiving the notification packet for configuration restoration completion, S3 sets its blocked stack port to the forwarding state, calculates the shortest forwarding path and packet discarding rules based on the ring topology with the shortest path forwarding algorithm, and sends notification packets for topology change from daisy chain type to ring type through its two stack ports.

Upon receiving the notification packet for configuration restoration completion, S3 confirms configuration restoration completion, and sets the blocked stack port to the forwarding state, and then the topology changes from daisy chain type to ring type. At this time, S3 will perform ring topology collection, calculate the shortest forwarding path and packet discarding rules based on the ring topology.

In an embodiment of this invention, the newly joined device one of whose stack ports is blocked calculates the shortest forwarding path and packet discarding rules, and then sends notification packets for topology change from daisy chain type to ring type to trigger other devices to calculate the shortest forwarding path.

Step 705 is the same as step 405.

Similarly, to avoid the problem caused by inconsistent processing speed of the configuration restoration completion notification packet by devices in the clockwise and anticlockwise directions, the forwarding hop information can be carried in the notification packet sent by S3 for configuration restoration completion. If the number of the devices M in the stacking system is an even number, the forwarding hops carried in the first notification packets at step B is $$\frac{M}{2};$$

if the number of the devices M in the stacking system is an odd number, the forwarding hops carried in the first notification packet sent through the stack port whose status changed from blocked to forwarding at step B is $$\frac{M+1}{2},$$

and the forwarding hops carried in the other first notification packet sent through the other stack port is $$\frac{M+1}{2}$$

or $$\frac{M-1}{2}.$$

Upon receiving the notification packet for configuration restoration completion, each device decreases the forwarding hop number carried in the notification packet by 1, and determines whether the forwarding hop is 0 after that; if yes, they do not process the packet; otherwise, they process the packet following step 705.

Take FIG. 6 as an example. The forwarding hop information carried in the notification packet sent by S3 for topology change from daisy chain type to ring type can be 5. S3, S0, S2, S1 and S8 calculate the shortest forwarding path and switch the traffic in turn in the anticlockwise direction; S3, S4, S5, S6 and S7 calculate the shortest forwarding path and switch the traffic in turn in the clockwise direction.

Based on the preceding method, when newly added devices in the stacking system provided by this invention make the topology change from daisy chain type to ring type, a stack port of one of the newly joined devices is blocked.

The master in the stacking system, used for restoring the configurations of the newly added devices after the devices in the stacking system perform another daisy chain topology convergence process based on the newly joined devices.

In the stacking system, the newly joined device one of whose stack ports is blocked, used for setting the blocked stack port to the forwarding state, calculating the shortest forwarding path based on the ring topology, and sending first notification packets for topology change from daisy chain type to ring type through its two stack ports after its configuration is restored.

Upon receiving the first notification packet, each device re-calculates the shortest forwarding path and switches the traffic, and then forwards the first notification packet.

When new devices join the stacking system, and a stack port of one of the newly joined devices is blocked, the devices in the stacking system collect topology information and calculate the shortest forwarding path based on the daisy chain topology formed by blocking a stack port of one of the newly joined devices, thus to implement daisy chain topology convergence based on the newly joined devices.

The master in the stacking system, also used for sending a second notification packet for configuration restoration completion after restoring the configuration of the newly joined devices.

The newly joined device one of whose stack ports is blocked, also used for confirming that its configuration is restored upon receiving the second notification packet.

Further, after each device in the stacking system calculates the shortest forwarding path, they also calculate the packet discarding rules, which comprise at least: discarding the packets sent by the local device, and discarding the packets not on the shortest forwarding path.

Preferably, the newly joined device one of whose stack ports is blocked is also used for carrying forwarding hop information in the first notification packets sent; wherein if the number of the devices M in the stacking system is an even number, $$\frac{M}{2}$$

is used as the forwarding hop to be carried in the first notification packets; if the number of the devices M in the stacking system is an odd number, $$\frac{M+1}{2}$$

is used as the forwarding hops to be carried in the first notification packet sent through the stack port whose status changed from blocked to forwarding, and $$\frac{M+1}{2}$$

or $$\frac{M-1}{2}$$

is used as the forwarding hop to be carried in the other first notification packet sent through the other stack port.

The devices that receive the first notification packets, also used for decreasing the forwarding hop carried in the first notification packets by 1, and determining whether the forwarding hop is 0 after that; if yes, they do not process the packets and discard the packets; otherwise, they continue to calculate the shortest forwarding path.

The preceding description shows that the method and system provided by this invention blocks a stack port of one of the newly joined devices in the stacking system to keep the daisy chain topology when the devices make the topology change to ring topology, thus to ensure that forwarding path of other devices will not be affected before the configurations of the newly joined devices are restored. After the configurations of the newly joined devices are restored, the blocked stack port is set to the forwarding state, and the newly joined device whose stack port is blocked starts to calculate the shortest forwarding path based on the ring topology, and then sends notification packets for topology change from daisy chain type to ring type to ensure that other devices perform shortest forwarding path calculation and traffic switch in turn, thus to ensure that the shortest forwarding path of each device is the same at a time and avoid traffic interruption.

Although an embodiment of the invention and its advantages are described in detail, a person skilled in the art could make various alternations, additions, and omissions without departing from the spirit and scope of the present invention as defined by the appended claims.

The invention claimed is:

1. A traffic switching method in a stacking system, wherein the stacking system includes original devices initially arranged in a daisy chain topology, the method comprising:
a new device joining the stacking system, wherein a first port of the new device is blocked so that the stacking system maintains the daisy chain topology;
each original device in the stacking system performing a daisy chain topology convergence process, thereby becoming aware of the new device;
the new device setting the first port in a forwarding state to form the stacking system into a ring topology;
each original device calculating a shortest forwarding path based on the ring topology; and
the new device sending a first notification packet, through the first port and to the original devices, to indicate a topology change from daisy chain to ring.

2. The method of claim 1, wherein performing the daisy chain topology convergence process comprises collecting, by each original device, topology information about the stacking system, and calculating a shortest forwarding path based on the daisy chain topology.

3. The method of claim 1, wherein the original devices include a master device, the method further comprising:
restoring, by the master device, after the new device joins the stacking system, a configuration of the new device, and sending a second notification packet indicating that the configuration of the new device has been restored; and
confirming, by the new device after receiving the second notification packet, that the configuration is restored.

4. The method of claim 3, further comprising re-calculating, by at least one of the original devices, the shortest forwarding path for the ring topology in response to the at least one of the original devices receiving the second notification packet.

5. The method of claim 1, further comprising: calculating packet discarding rules, by a given device in the stacking system, wherein the packet discarding rules include rules for discarding packets both originated and received by the given device.

6. The method of claim 5, wherein calculating the packet discarding rules includes calculating rules for discarding a packet received by the given device via a path through the stacking system other than the shortest forwarding path from a source of the packet to the given device.

7. The method of claim 1, wherein there are M devices in the stacking system, wherein the first notification packet initially includes a count of forwarding hops that is approximately M/2, the method further comprising:
   decreasing, by a given device in the stacking system receiving the first notification packet, the count of forwarding hops included in the first notification packet by one, and determining whether the count of forwarding hops is zero;
   if the count of forwarding hops is zero, not processing, by the given device, the first notification packet further; and
   if the count of forwarding hops is not zero, re-calculating, by the given device, the shortest forwarding path, and forwarding the first notification packet to another device in the stacking system.

8. The method of claim 1, wherein the new device further includes a second port, said method further comprising sending, by the new device, a copy of the first notification packet through the second port.

9. A traffic switching method for a new device in a stacking system, wherein the stacking system includes original devices initially arranged in a daisy chain topology, and wherein the new device has a first port and a second port to rearrange the stacking system into a ring topology, the method comprising:
   in the new device,
      setting a first port of the new device to a blocked state;
      initializing a configuration of a ring topology with the first port blocked to maintain the daisy chain topology;
      setting the first port to a forwarding state, thereby rearranging the stacking system from the daisy chain topology to the ring topology; and
      sending a first notification packet to the original devices through the first port and the second port to indicate the topology change from daisy chain to ring.

10. The method of claim 9, wherein the original devices include a master device, said method further comprising restoring, by the new device the configuration with participation from the master device.

11. The method of claim 10, further comprising:
   confirming, by the new device, that the configuration is restored.

12. The method of claim 9, wherein the new device includes a second port, said method further comprising sending, by the new device, a copy of the first notification packet through the second port.

13. A stacking system comprising:
   a plurality of original devices, one of which is a master device; and
   one or more new devices that join the stacking system;
   wherein the master device is to restore configurations of the one or more new devices that join the stacking system, wherein the restoring takes place after the plurality of original devices perform a daisy chain topology convergence process based on the one or more new devices joining the stacking system; and
   wherein a given device of the one or more new devices includes a first port that is initially blocked, the given device is to:
      (i) restore a configuration,
      (ii) set the first port to a forwarding state,
      (iii) calculate a shortest forwarding path based on the stacking system changing to a ring topology, and
      (iv) send a first notification packet for the topology change from daisy chain to ring through the first port, wherein upon receiving the first notification packet, one of the plurality of original devices is to recalculate the shortest forwarding path, and then forward the first notification packet.

14. The stacking system of claim 13, wherein each of the plurality of original devices is to collect topology information and to calculate the shortest forwarding path based on the daisy chain topology formed by blocking the first port, to implement a daisy chain topology convergence based on the given device joining the stacking system.

15. The stacking system of claim 13, wherein the master device is further to send a second notification packet to indicate configuration restoration completion after the master device restores the configuration of the given device.

16. The stacking system of claim 15, wherein the given device is to confirm that the configuration is restored upon receiving the second notification packet.

17. The stacking system of claim 13, wherein the given device is to calculate packet discarding rules after calculating the shortest forwarding path, wherein the packet discarding rules include rules for discarding a packet received by the given device via a path through the stacking system other than the shortest forwarding path from a source of the packet to the given device.

18. The stacking system of claim 17, wherein the packet discarding rules include rules for discarding packets both originated and received by the given device.

19. The stacking system of claim 13, wherein the stacking system comprises M devices, wherein the first notification packet includes a count of forwarding hops that is approximately M/2, and wherein an original device of the plurality of original devices is to:
   receive the first notification packet, decrease the count of forwarding hops included in the first notification packet by one, and determine whether the count of forwarding hops is zero;
   in response to a determination that the count of forwarding hops is zero, the original device is not to process the first notification packet further,
   and in response to a determination that the count of forwarding hops is not zero, the original device is to recalculate the shortest forwarding path, and forward the first notification packet to another device in the stacking system.

20. The stacking system of claim 13, wherein the given device includes a second port and wherein the given device is to send a copy of the first notification packet through the second port.

* * * * *